United States Patent [19]

Nickel

[11] Patent Number: 5,636,444
[45] Date of Patent: Jun. 10, 1997

[54] CUTTING DEVICE WITH FRICTIONAL BRAKE HAVING A SERVO DEVICE WITH SWITCHING DEVICE FOR CANCELLING THE BRAKING EFFECT

[75] Inventor: Hans Nickel, Cottenweiler, Germany

[73] Assignee: Andreas Stihl, Waiblingen, Germany

[21] Appl. No.: 237,613

[22] Filed: May 3, 1994

[30] Foreign Application Priority Data

May 3, 1993 [DE] Germany ............ 43 14 427.6

[51] Int. Cl.⁶ .......................... A01D 34/68; F16D 49/20
[52] U.S. Cl. .......................... 30/276; 30/277.4; 56/11.3; 56/12.7; 188/77 R; 188/170; 192/17 R; 477/202
[58] Field of Search .................. 30/276, 240, 264, 30/277.4, 381, 382; 477/199–202; 188/77 R, 77 W, 170; 56/11.3, 12.7; 192/17 R

[56] References Cited

U.S. PATENT DOCUMENTS 4,006,528  2/1977  Katsuya ........................ 30/276

*Primary Examiner*—Rinaldi I. Rada
*Assistant Examiner*—Clark F. Dexter
*Attorney, Agent, or Firm*—Robert W. Becker & Associates

[57] ABSTRACT

A cutter has a drive motor and a drive shaft. A rotating cutting tool is connected to the drive shaft. A centrifugal clutch is connected between the drive motor and the drive shaft. A frictional brake having a brake drum and a brake element positioned on the brake drum to achieve a braking effect is provided. The frictional brake is connected to the drive shaft. A servo device, which includes a folding bellows, is connected to the frictional brake for releasing the brake element from the brake drum to cancel the braking effect. A switching device for activating the servo device is provided.

16 Claims, 4 Drawing Sheets

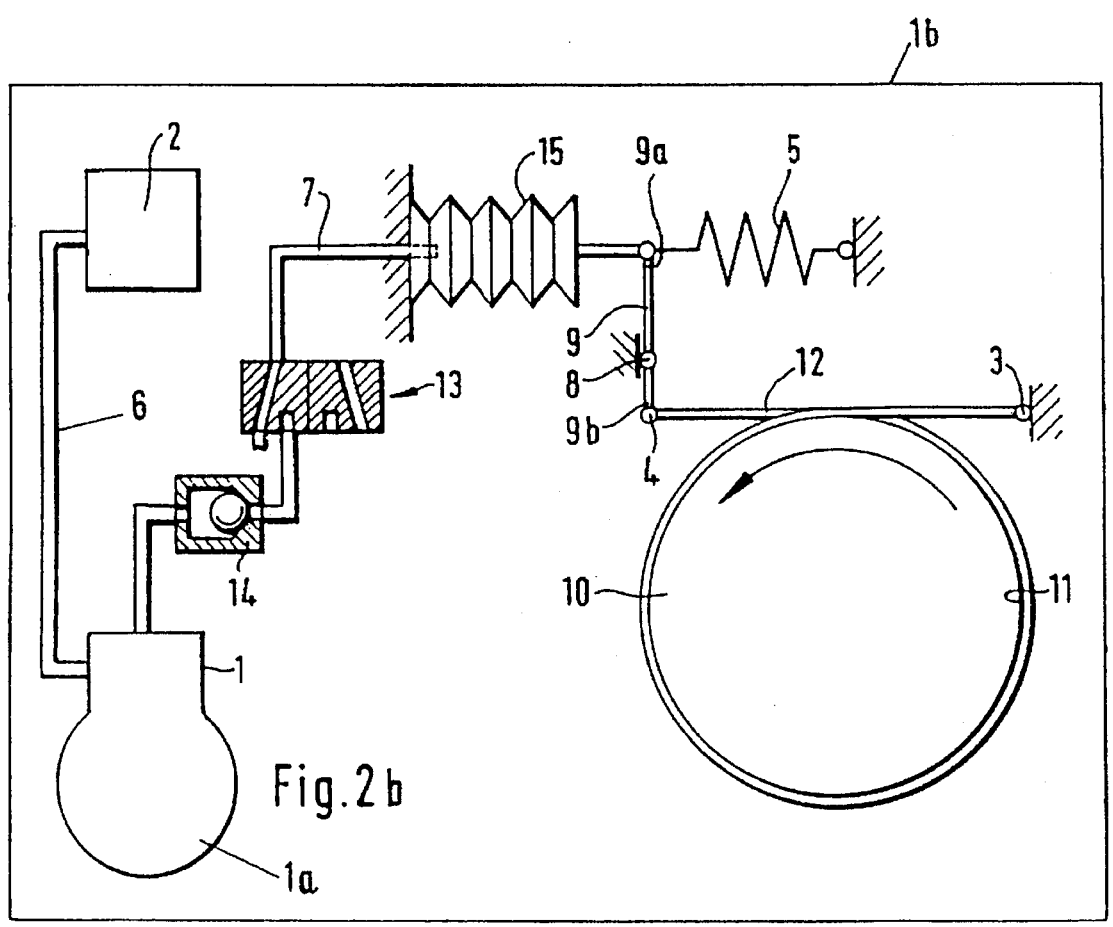

CUTTING DEVICE WITH FRICTIONAL BRAKE HAVING A SERVO DEVICE WITH SWITCHING DEVICE FOR CANCELLING THE BRAKING EFFECT

BACKGROUND OF THE INVENTION

The present invention relates to a cutting device or cutter, also called trimmer, with a drive motor, a rotary cutting tool connected to a drive shaft and a centrifugal clutch connected between the drive motor and the drive shaft. A frictional brake is provided on the output side and has a brake drum with a braking element positioned thereon. A means for removing the braking element from the brake drum upon use of the device is provided.

From U.S. Pat. No. 4,006,528 a cutter with a drive motor is known in which a rotary cutting tool is positioned on a drive shaft and a centrifugal clutch is provided between the drive motor and the drive shaft. The element of the centrifugal clutch positioned on the output side serves as a brake drum of a frictional brake. The braking element for loading the brake drum is prestressed by a spring into the braking position. With a lever provided at the handle of the device a cable is actuated with which the braking element is removed or released from the brake drum.

With the known arrangement it is possible to brake the rotating cutting tool when the cutter is no longer to be used or put away because the correspondingly strong spring tightly tensions the loop, i.e., the braking element about the brake drum. On the other hand, when operating the cutter, a correspondingly great force must be exerted by the operator in order to be able to tension the spring that loads the braking element with the lever provided at the handle of the device to thereby release the brake.

It is therefore an object of the present invention to provide a cutter of the aforementioned kind with which the operation is facilitated and the amount of force to be exerted by the operator is reduced.

SUMMARY OF THE INVENTION

The cutter according to the present invention is primarily characterized by:

a drive motor;

a drive shaft;

a rotating cutting tool connected to the drive shaft;

a centrifugal clutch connected between the drive motor and the drive shaft;

a frictional brake comprising a brake drum and a brake element positioned on the brake drum to achieve a braking effect, the frictional brake connected to the drive shaft;

a servo device connected to the frictional brake for releasing the brake element from the brake drum to cancel the braking effect; and a switching device for activating the servo device.

The important advantages of the present invention are that with simple measures a release of the brake can be achieved without an additional force exertion being required from the operator. Since for the servo device and the switching device means of a small weight can be used, the total weight of the cutter is not considerably effected.

Preferably, the servo device comprises a pneumatically operated folding bellows with a working chamber and a vacuum source connected to the working chamber. Preferably, the drive motor is an internal combustion engine with a crankshaft casing and a suction pipe. Advantageously, the cutter further comprises a connecting line between the vacuum source and the working chamber. Expediently, the vacuum source is the suction pipe or the crank shaft casing of the internal combustion engine.

Preferably, the switching device is a switching valve connected within the connecting line. Advantageously, the switching valve is a 3/2-way valve.

The cutter preferably further comprises a check valve connected within the connecting line between the vacuum source and the switching device.

Advantageously, the cutter further comprises a cable for actuating the switching valve and the switching valve preferably comprises a valve tappet.

The cable is preferably the pulling cable of a Bowden control cable.

Advantageously, the Bowden control cable is the actuator for the throttle of the internal combustion engine. The Bowden control cable has a sleeve and one end of the sleeve is preferably coupled to the valve tappet.

The valve tappet has preferably a rigid lever fixedly connected thereto and one end of the sleeve of the Bowden control cable is connected to the lever.

In a preferred embodiment of the present invention, the throttle has a follower disk connected thereto so as to be pivotable with the throttle. The follower disk has an outer edge that provides a cam with a curved control path with a cam for actuating the valve tappet. The pulling cable of the Bowden control cable is connected to said follower disk.

The bowden control cable preferably acts on the switching valve such that a throttle lock is released.

In another embodiment of the present invention, the switching valve comprises a valve tappet with a free end and the cable is guided across the free end of the valve tappet at an angle of less than 180°, preferably between 130° and 160°, whereby the cable is stretched upon actuation.

Advantageously, the servo device comprises a solenoid and an electric switch for actuating the solenoid.

In a preferred embodiment of the present invention, the servo device is a pneumatically actuated folding bellows having a working chamber that is connected to a vacuum source. Such a servo device can be manufactured inexpensively and is very reliable so that operational disruptions will not occur. It is further more expedient that the drive motor is an internal combustion engine and that the vacuum source is the pressure within the suction pipe of the internal combustion engine whereby a connection line is provided between the suction pipe and the folding bellows.

The switching device is preferably a switching valve connected within the connection line whereby a 3/2-way valve is especially suitable.

In order to prevent adverse effects of pressure fluctuations respectively of changing levels within the vacuum source on the servo device, between the switching valve and vacuum source a check valve is provided that shuts off the connecting line to the folding bellows.

The switching device can be actuated in an especially simple manner by a cable, preferably the pulling cable of a Bowden control cable. For simplifying the constructive arrangement and minimizing the required parts, it is expedient that the Bowden control cable simultaneously serves as the actuator for the throttle.

In a preferred embodiment of the valve actuation, the Bowden control cable is guided across a free end of the valve tappet at an angle of less than 180°, preferably at an angle between 130° and 160°, whereby the cable is stretched upon actuation. Another embodiment of the valve actuation is such that one end of the sleeve of the Bowden control cable is coupled with the valve tappet. For this purpose, the end of the sleeve of the Bowden control cable is preferably supported at a rigid lever that is connected to the valve tappet. In another embodiment of the valve actuation, the Bowden control cable is connected to a pivotable disk that is connected to the throttle so as to be pivotable therewith whereby the disk at its outer edge is provided with at least one cam that serves for actuating the valve tappet. In order to prevent the brake from being released during idling of the drive motor, it is expedient that the Bowden control cable can act on the switching device only after releasing a throttle lock.

As an alternative to the pneumatic servo device it is also possible to provide a solenoid which is activatable by an electric switch.

BRIEF DESCRIPTION OF THE DRAWINGS

This object, and other objects and advantages of the present invention, will appear more clearly from the following specification in conjunction with the accompanying drawings, in which:

FIG. 2b shows a schematic representation of a brake that is releasable with a servo device, with the crankcase acting as the vacuum source;

DESCRIPTION OF PREFERRED EMBODIMENTS

The present invention will now be described in detail with the aid of several specific embodiments utilizing FIGS. 1 through 5.

Figure 1:
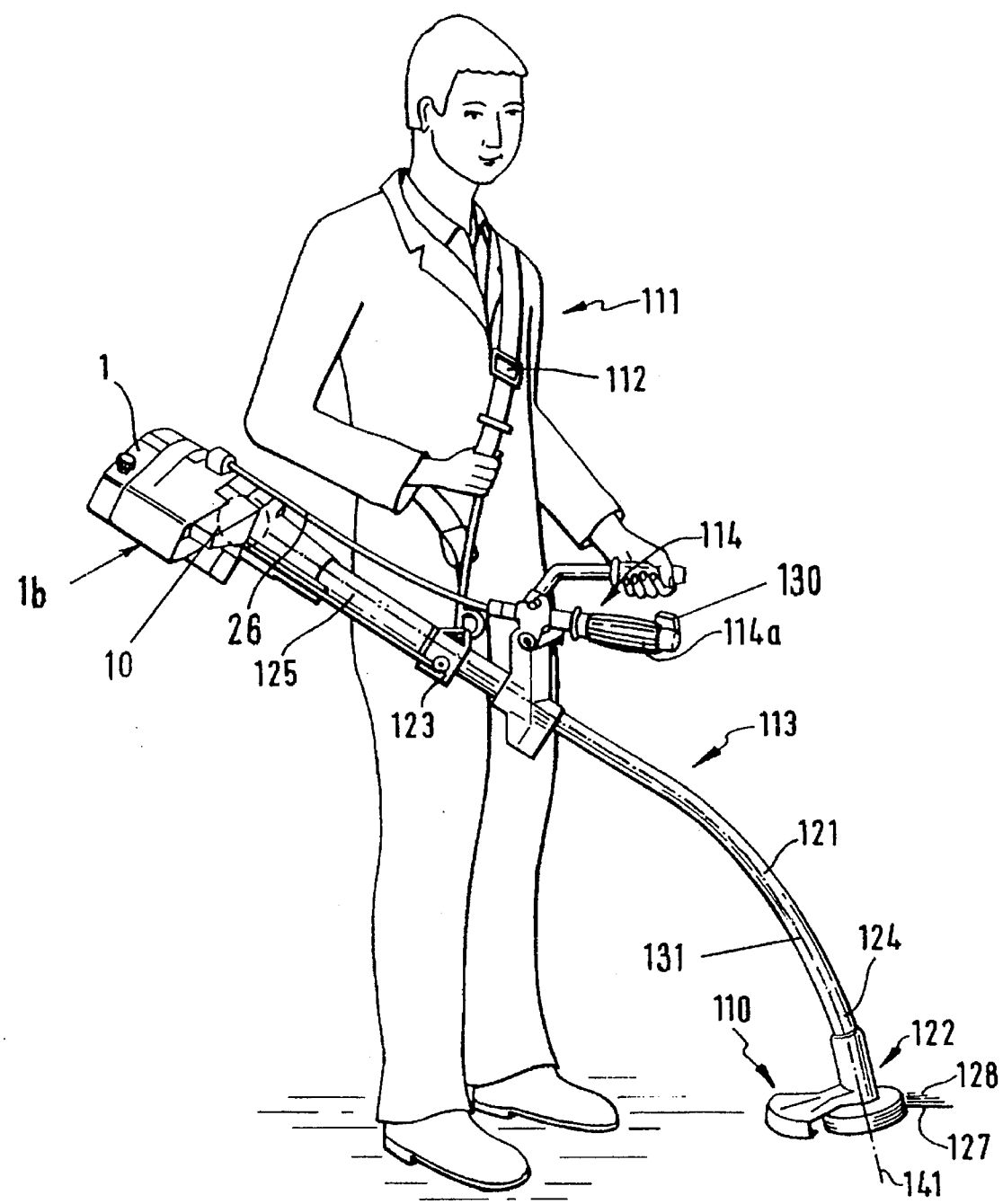
FIG. 1 shows a perspective view of a cutter held by an operator.

The cutter or trimmer 113 represented in FIG. 1 is carried and guided by an operator 111. A carrying strap 112 is guided about one shoulder of the operator 111 and is connected to a holder 123 provided at the center of gravity of the cutter 113. The holder 123 is connected to a protective tube 121 which at its end 124 facing the ground is provided with the cutter head 122. The cutter head 122 is driven via a drive shaft 131 supported within the protective tube 121 by a drive motor 1 which is arranged at the other end 125 of the protective tube 121. In the shown embodiment the drive motor is an internal combustion engine, especially a two cycle engine.

The cutter 113 is guided with a handle 114 which is arranged on the protective tube 121 below the holder 123. With the right handle portion 114a, the throttle cable 26 for actuating the internal combustion engine 1 is actuated, for example, by rotating the grip of the handle. The handle 114 also has a well-known throttle lock 130.

The cutter head 122 is provided with a cutting knife or a cutting thread (string) 127 which upon rotation of the cutter head 122 will align itself approximately radially to the axis of rotation 141 to thereby define a cutting plane 128 which, depending on how the cutter 113 is guided, is substantially parallel to the ground. In the area facing the user 111 a protective shield 110 is provided at the cutting plane 128 which extends over a circular segment of the cutting plane 128.

Figure 2A:
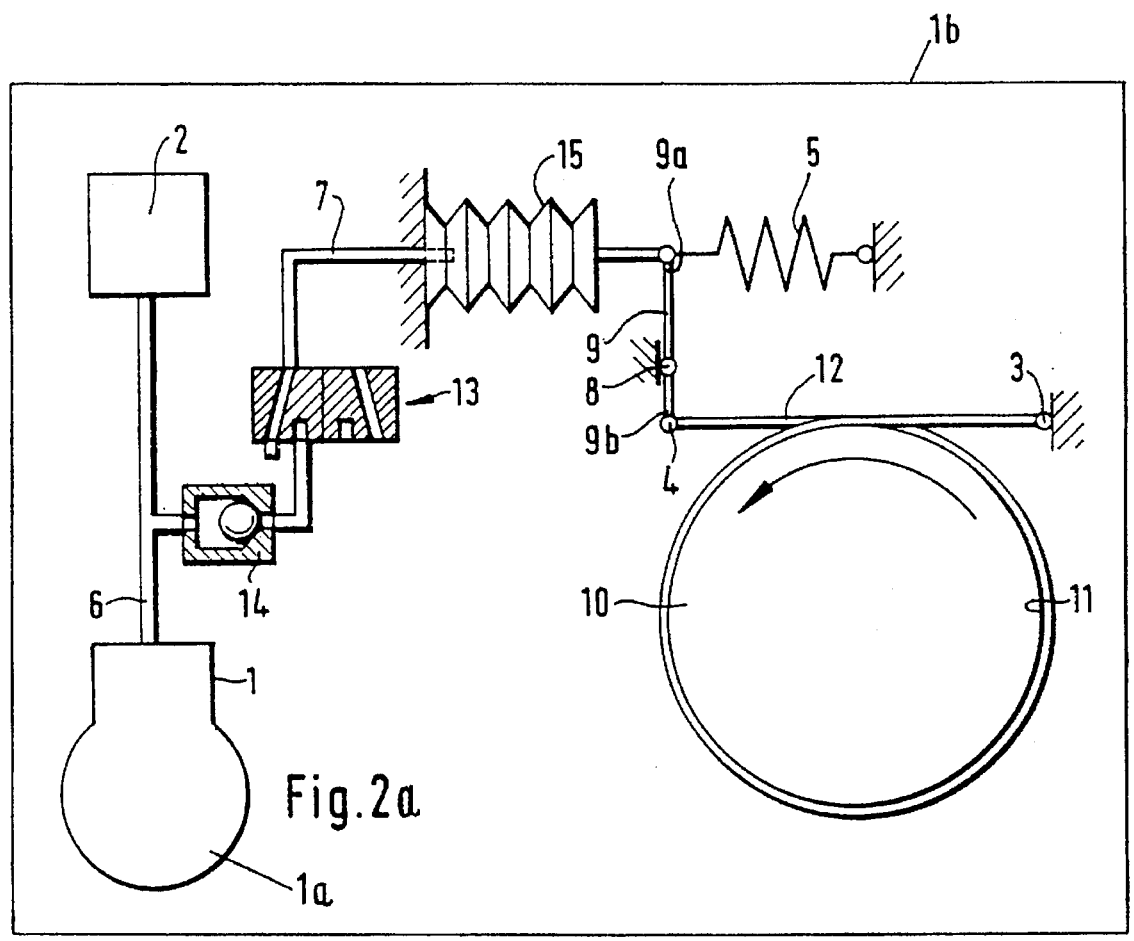
FIG. 2a shows a schematic representation of a brake that is releasable with a servo drive, with the suction line acting as a vacuum source.

FIG. 2 shows a brake drum 10 which is rotationally fixedly connected to the drive shaft 131 within the housing 1b (see FIGS. 1 and 2) and which has a periphery that is surrounded by a brake band (loop) 12. The brake band 12 is supported with one end 3 at the housing and with the other end 4 at an end 9b of a deflecting lever 9 which is supported in a pivotable manner with its ends in bearings 8. The other end 9a of the deflecting lever 9 is connected to the folding bellows 15 which is provided with a pneumatically loadable working chamber. The folding bellows 15 is provided with a tension spring 5 which engages at the other end 9a of the deflecting lever 9 and which biases the folding bellows 15 into an extended rest position when the working chamber is not loaded with a vacuum. The working chamber is connected via a pneumatic connecting line 7 with a vacuum source. The vacuum source is preferably a suction pipe 6 connected between the carburetor 2 and the drive motor 1. However, it is also possible to use as the vacuum source the crankcase (crankshaft casing) 1a of the internal combustion engine, especially of a two-cycle engine.

In the pneumatic connecting line 7, a switching valve (control valve) 13 and a check valve 14 are arranged which check valve 14 shuts off the connecting line 7 in the direction toward the folding bellows 15. The control or switching valve 13 is a 3/2-way valve so that in a first position the working chamber of the folded bellows is connected with the surrounding atmosphere (atmospheric pressure) and at the same time the connecting line 7 is closed off to the vacuum source (suction line 6 or crankshaft 1a). In a second position the working chamber is connected to the vacuum source (suction line 6 or crankshaft 1a) whereby at the same time communication to the surrounding atmosphere is shut off.

During operation of the cutter the control or switching valve 13 is actuated so that it is switched to its second position and the working chamber of the folding bellows 15 is connected with the vacuum source (suction line 6 or crankshaft 1a). This results in that the folding bellows 15 contracts counter to the force of the tension spring 5 and the deflecting lever 9 is pivoted about the bearing 8. The end 4 of the brake band (brake element) 12 connected to the other end 9b of the deflecting lever 9 is displaced so that a release of the brake band 12 results and no frictional force is exerted by the brake band 12 on the peripheral surface 11 of the brake drum 10. When due to certain operational conditions, for example, during idling or shutting off of the cutter, the control or switching valve 13 is automatically returned into its first position, an interruption of the connection of the working chamber to the vacuum source (suction 6 or crankshaft 1a) takes place and communication to the atmosphere is provided. The folding bellows 15 expands and thus performs a stroke in the opposite direction whereby the tension spring 5 is returned into its rest position. The resulting deflection of the deflecting lever 9 results in the brake band 12 contacting and tightly wrapping around the brake drum 10 so that the drive shaft within the protective tube 121 and thus the cutting tool is set still.

Figure 3:
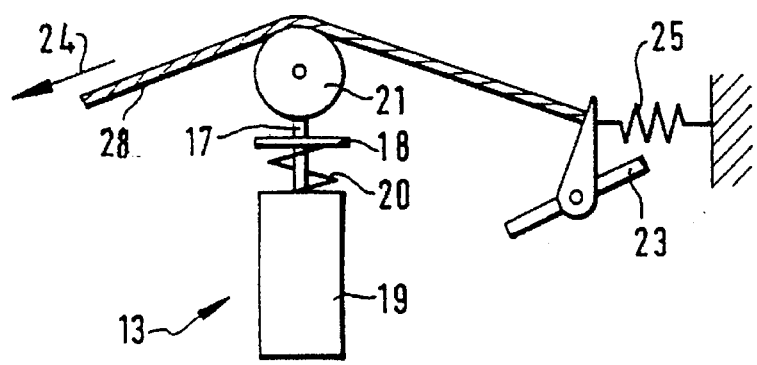
FIG. 3 shows a first embodiment of the actuation of the switching valve with a cable.

In FIG. 3 the control valve 13 is represented with a corresponding actuation arrangement. From the housing 19 of the control or switching valve 13 a valve tappet 17 extends which is provided with a radial collar 18. A pressure spring 20 is arranged between the housing 19 and the collar 18. To the end of the valve tappet 17 a roller 21 is connected across which a cable 28, e.g., the throttle cable connected to the throttle 23, is guided. Upon actuation the throttle cable 28 is pulled in the direction of arrow 24 which results in the throttle 23 being pivoted about its pivot axis and the return spring 25 connected thereto being tensioned. Due to the forces acting on the cable 28, the cable 28 is stretched and forces the valve tappet 17 counter to the force of the pressure spring 20 into the housing 19 so that the control or switching valve is switched. When the operator releases the accelerator lever of the cutter, the force of the pressure spring 20 is greater than the force of the cable 28 and the control or switching valve 13 is returned into its initial position.

Figure 4:
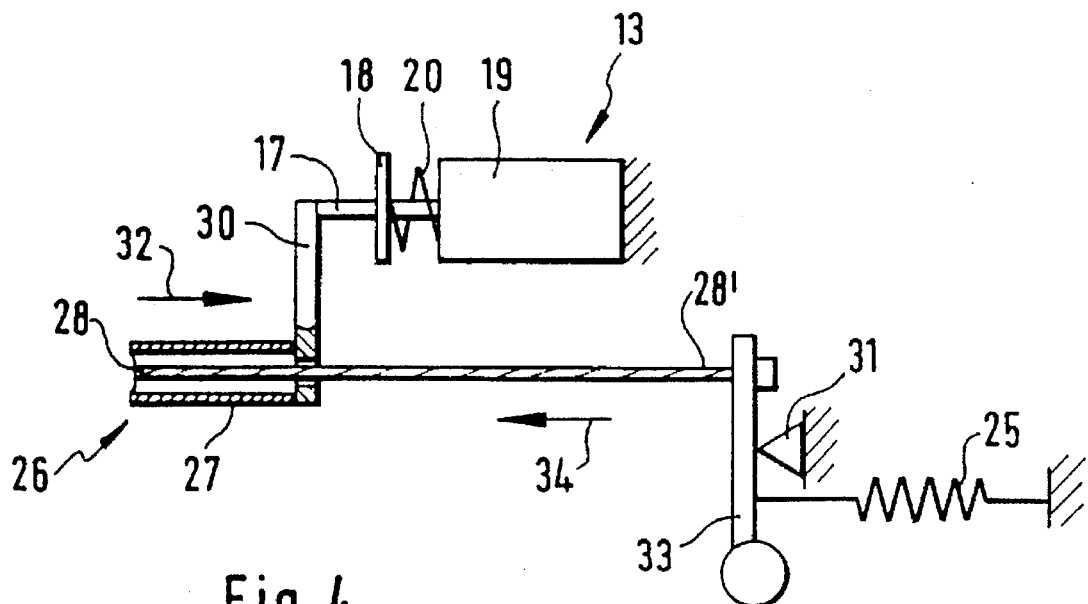
FIG. 4 shows a second embodiment for actuating the switching valve with a Bowden control cable.

FIG. 4 shows a control or switching valve 13 which as in the embodiment of FIG. 3 is also provided with a valve tappet 17 extending from the housing 19 whereby the valve tappet 17 has a radial collar 18. A pressure spring 20 is arranged between the housing and the radial collar. The outer end of the valve tappet 17 is connected with a rigid lever 30. The end of the sleeve 27 of the Bowden control cable 26 is supported at the lever 30, the lever 30 acting on the valve tappet 17 counter to the bias by pressure spring 20. The pulling cable 28 of the Bowden control cable 26 extends through an opening in the lever 30 and the end 28' of the pulling cable 28 is connected with the lever 33 of the throttle which in its rest position abuts at an idle stop 31. As already mentioned in connection with FIG. 3, a return spring 25 engages the lever 33 of the throttle.

Upon actuation of the accelerator lever (not represented in the drawing) the sleeve 27 of the Bowden control cable is displaced in the direction of arrow 32 and acts on the lever 30 so that the valve tappet 17 is moved counter to the force of the pressure spring 20 into the housing 19. Accordingly, the control valve 13 is switched into its second position. Onto the pulling cable 28 of the Bowden control cable 26 a pulling force in the direction of arrow 34 is exerted so that the end 28' lifts the lever 33 of the throttle from the idle stop 31. With the disclosed arrangement it is ensured that first the brake is released before an increase of the number of revolutions of the drive motor can take place. When the accelerator lever is released, a return of the throttle and of the control valve 13 with the return spring 25 and the pressure spring 20 occurs.

Figure 5:
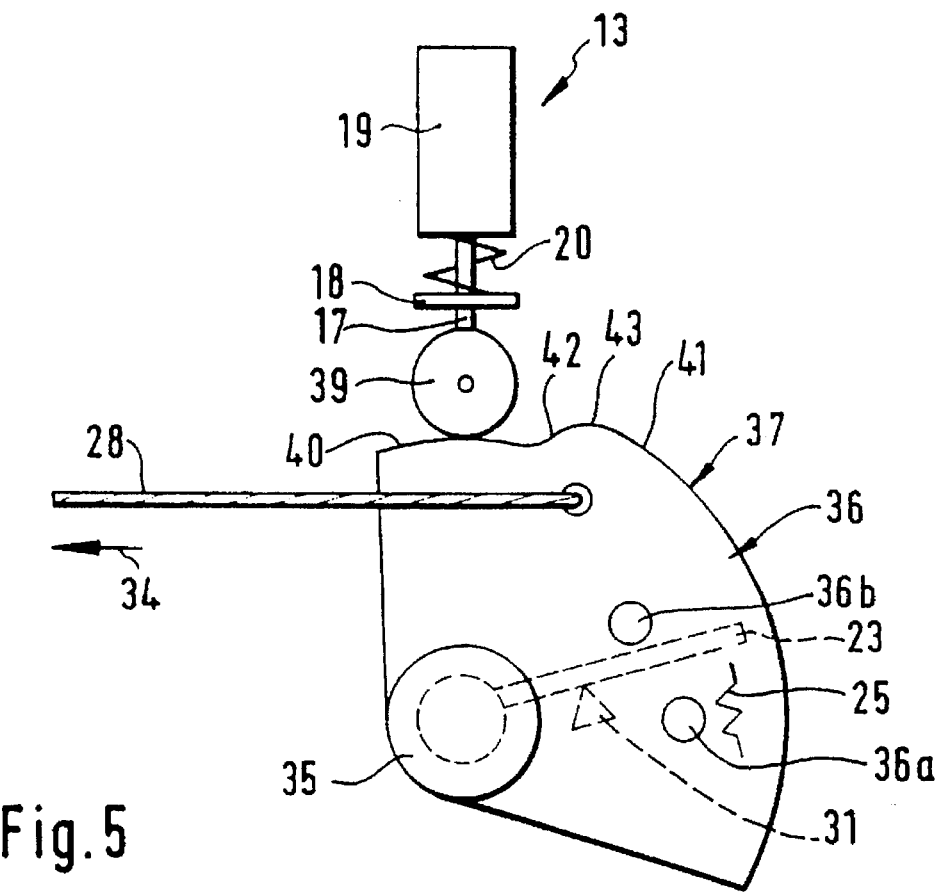
FIG. 5 shows a switching valve actuation with a cam disk.

As can be seen in FIG. 5, a follower disk 36 is connected to the shaft 35 of the throttle which is perpendicular to the axis of rotation of the shaft 35 and which is pivotable about this axis. The outer edge 37 of the disk 36 is in the form of a control path for the valve tappet 17 which is supported with its roller 39 connected to its forward end at the outer edge 37 of the disk 36. This outer edge 37 has two sections 40 and 41 with different radii and a transition 42 disposed therebetween which provides a cam 43. When a pulling force acts on the cable 28 connected to the disk 36 in the direction of arrow 34, the disk 36 is pivoted about the shaft 35 of the throttle so that the cam 43 lifts the roller 39 of the valve tappet 17 resulting in a switching of the control valve 13. The switching of the valve 13 takes place before a first follower 36a arranged on the disk 36 entrains the throttle 23 in the direction of full load so that the brake, before an increase of the number of revolutions of the drive motor takes place, is reliably released. This is especially important when the brake drum 10 is the clutch cup of a centrifugal clutch. When the pulling force on the cable 28 is cancelled, the follower disk 36 is returned by the tension spring 25 whereby a second follower 36b entrains the throttle 23 only after pivoting in direction toward the idle stop 31 which ensures a switching of the control valve 13 by passing the cam 43. The control path 40 has a shorter relative radius to the shaft 35 of the throttle than the curved control path 41. The followers 36a and 36b have a distance in the pivoting direction which ensures a switching of the control valve before or at least upon reaching the idle position of the throttle 23.

The present invention is, of course, in no way restricted to the specific disclosure of the specification and drawings, but also encompasses any modifications within the scope of the appended claims.

What I claim is:

1. A cutter comprising:
    a drive motor;
    a drive shaft operatively connected to said drive motor;
    a rotatable cutting tool connected to said drive shaft;
    a frictional brake comprising a brake drum and a brake element positioned on said brake drum to achieve a braking effect, said frictional brake connected to said drive shaft;
    a servo device connected to said frictional brake for releasing said brake element from said brake drum to cancel the braking effect; and
    a switching device connected to said servo device for activating said servo device;
    said servo device comprising a pneumatically operated folding bellows with a working chamber therein, wherein said vacuum source is selectively connected to said working chamber through said switching device.

2. A cutter according to claim 1, wherein said drive motor is an internal combustion engine with a crankshaft casing and a suction pipe.

3. A cutter according to claim 1, further comprising a connecting line connecting said vacuum source, and switching device and said working chamber.

4. A cutter according to claim 3, wherein said vacuum source is said suction pipe.

5. A cutter according to claim 3, wherein said vacuum source is said crankshaft casing.

6. A cutter according to claim 3, wherein said switching device is a switching valve connected within said connecting line.

7. A cutter according to claim 6, wherein said switching valve is a 3/2-way valve.

8. A cutter according to claim 7, further comprising a check valve connected within said connecting line between said vacuum source and said switching valve.

9. A cutter according to claim 6, further comprising a cable connected to said switching valve for actuating said switching valve and wherein said switching valve has a valve tappet.

10. A cutter according to claim 9, wherein said cable is a pulling cable of a Bowden control cable.

11. A cutter according to claim 10, wherein said internal combustion engine comprises a throttle and wherein said Bowden control cable is connected to said throttle as an actuator for said throttle.

12. A cutter according to claim 11, wherein said throttle has a follower disk connected thereto so as to be pivotable with said throttle, said follower disk having an outer edge with a cam, said cam providing a curved control path for actuating said valve tappet, wherein said pulling cable of said Bowden control cable is connected to said follower disk.

13. A cutter according to claim 10, wherein said Bowden control cable has a sleeve and one end of said sleeve is coupled to said valve tappet.

14. A cutter according to claim 13, wherein said valve tappet has a rigid lever fixedly connected thereto and wherein said one end of said sleeve is connected to said lever.

15. A cutter according to claim 9, wherein said switching valve comprises a valve tappet with a free end and wherein said cable is guided across said free end of said valve tappet at an angle of less than 180° and wherein said cable is stretched upon actuation.

16. A cutter according to claim 15, wherein said angle is between 130° and 160°.

* * * * *